US011117334B2

(12) United States Patent
Blaszczyk et al.

(10) Patent No.: US 11,117,334 B2
(45) Date of Patent: Sep. 14, 2021

(54) MODULAR FIBER PLACEMENT HEAD (71) Applicant: Fives Machining Systems, Inc., Fond du Lac, WI (US)

(72) Inventors: Stanislaus J. Blaszczyk, Cincinnati, OH (US); Christopher D. Nicholson, Cincinnati, OH (US); Brent L. Keller, Cincinnati, OH (US); Martha A. Bauer, Cincinnati, OH (US); Jeffrey C. Roberts, Elgin, IL (US)

(73) Assignee: FIVES MACHINING SYSTEMS, INC., Fond du Lac, WI (US)

( * ) Notice: Subject to any disclaimer, the term of this patent is extended or adjusted under 35 U.S.C. 154(b) by 0 days.

(21) Appl. No.: 16/898,904

(22) Filed: Jun. 11, 2020

(65) Prior Publication Data

US 2020/0391451 A1 Dec. 17, 2020

Related U.S. Application Data (60) Provisional application No. 62/861,605, filed on Jun. 14, 2019.

(51) Int. Cl.
*B29C 70/38* (2006.01)
*B29K 105/08* (2006.01)

(52) U.S. Cl.
CPC .... *B29C 70/388* (2013.01); *B29K 2105/0872* (2013.01)

(58) Field of Classification Search
CPC .......... B29K 2105/0872; B29C 70/388; B29C 70/384
See application file for complete search history.

(56) References Cited

U.S. PATENT DOCUMENTS

| 5,110,395 | A  | 5/1992  | Vaniglia |
| 5,290,389 | A  | 3/1994  | Shupe et al. |
| 5,698,066 | A  | 12/1997 | Johnson et al. |
| 5,979,531 | A  | 11/1999 | Barr et al. |
| 8,438,825 | B2 | 5/2013  | Beraud et al. |
| 8,954,180 | B2 | 2/2015  | Oldani |
| 9,149,949 | B2 | 10/2015 | Johnson et al. |

(Continued)

FOREIGN PATENT DOCUMENTS

CN 103737945 A 4/2014

OTHER PUBLICATIONS

International Search Report for International Application No. PCT/US2020/037223 dated Sep. 28, 2020 (3 pages).

(Continued)

*Primary Examiner* — Vishal I Patel
(74) *Attorney, Agent, or Firm* — Reising Ethington P.C.

(57) ABSTRACT

A fiber placement head for applying a plurality of composite tape segments on a mold, including one or more lane assemblies each having one or more fluid passageways that receive compressed air; a piston assembly that selectively moves relative to the lane assembly in response to receipt of compressed air; an attachment site configured to releasably couple the lane assembly to a portion of the fiber placement head; an aperture in the lane assembly configured to receive a fastener that releasably couples a subassembly to the lane module, wherein a piston from the piston assembly engages the subassembly; and a subassembly releasably coupled to each lane module by the fastener received by the aperture.

15 Claims, 12 Drawing Sheets

(56) References Cited

U.S. PATENT DOCUMENTS

| | | |
|---|---|---|
| 9,314,974 B2 | 4/2016 | Buttrick et al. |
| 9,315,007 B2 | 4/2016 | Vaniglia |
| 9,694,546 B2 | 7/2017 | Kisch |
| 9,782,937 B1 | 10/2017 | Modin et al. |
| 10,112,348 B2 | 10/2018 | Oldani |
| 2010/0276087 A1* | 11/2010 | Weinman .............. B29C 70/384 156/433 |
| 2013/0111725 A1 | 5/2013 | Torres Martinez |
| 2014/0238612 A1* | 8/2014 | Vaniglia ................ B65H 59/04 156/510 |
| 2018/0361688 A1 | 12/2018 | Kaiser et al. |
| 2019/0061288 A1 | 2/2019 | Wulfsberg et al. |
| 2019/0077094 A1 | 3/2019 | Hamlyn et al. |

OTHER PUBLICATIONS

Written Opinion for International Application No. PCT/US2020/037223 dated Sep. 28, 2020 (4 pages).

* cited by examiner

MODULAR FIBER PLACEMENT HEAD

TECHNICAL FIELD

The present application relates to fiber placement machines and, more particularly, to a modular fiber placement head.

BACKGROUND

Fiber placement machines are used to create composite workpieces. Composite material, in the form of fibrous material impregnated with resin, is applied by the machines to a mold or mandrel at precise locations and lengths to collectively form a composite workpiece. The fiber placement machines move a fiber placement head over the mold to precisely apply composite tape in the ultimate shape of the composite workpiece. As the fiber placement head moves, it leaves a plurality of composite tape segments, also referred to as course, or tows, behind on the mold. The quantity of composite tape segments can range in number from two to thirty-two. While a plurality of composite tape strands can be simultaneously applied as part of the course, the fiber placement head can individually control each of the tows as part of applying the course. The automatic application of these composite tape segments to the mold involves the cooperation of a diverse collection of machinery that holds, moves, and ultimately cuts the composite tape. For example, a fiber placement head applying a sixteen-tow course of composite tape over a mold can include individual lanes for each tow and mechanisms that hold and cut the tape. But as the fiber placement head repeatedly applies courses of to a mold, the machinery in the head can begin to wear and ultimately fail or benefit from service. Fiber placement heads having multiple lanes for feeding a plurality of individual composite tape strands may only have one or two lanes of the head that need service. Yet, a fiber placement head capable of applying many lanes of composite tape uses a monolithic structure that collectively includes all of the mechanical elements for applying the composite tape to a mold. Servicing the fiber placement head involves removing the fiber placement head from a robot arm thereby idling the fiber placement machine. It is possible to have extra or spare fiber placement heads to replace existing fiber placement heads. But purchasing and storing extra fiber replacement heads that may remain largely idle can be costly.

SUMMARY

In one implementation, a fiber placement head for applying a plurality of composite tape segments on a mold, including one or more lane assemblies each having one or more fluid passageways that receive compressed air; a piston assembly that selectively moves relative to the lane assembly in response to receipt of compressed air; an attachment site configured to releasably couple the lane assembly to a portion of the fiber placement head; an aperture in the lane assembly configured to receive a fastener that releasably couples a subassembly to the lane module, wherein a piston from the piston assembly engages the subassembly; and a subassembly releasably coupled to each lane module by the fastener received by the aperture.

DETAILED DESCRIPTION

A fiber placement machine can use a robotic arm carrying a fiber placement head having a modular cut, clamp, and restart (CCR) assembly. The CCR assembly includes a plurality of cutting lane assemblies, clamping lane assemblies, and restarting lane assemblies each of which is removably coupled to the fiber placement head. Each lane assemblies can be designed to process one or more strands of composite tape that pass through it. And any one or more of the assemblies can be removed from the fiber placement head without affecting the performance of the other lane assemblies that are still attached to the head. That is, a fiber placement head that applies sixteen lanes of fiber tape could include lane assemblies that individually control two lanes of fiber tape. In such an implementation, the CCR assembly can include twenty-four lane assemblies (eight cutting lane assemblies, eight clamping lane assemblies, and eight restarting lane assemblies each controlling two lanes of fiber). Removal of one cutting lane assembly, one clamping lane assembly, and one restarting lane assembly from the CCR assembly that collectively control two lanes of common composite tape leaves the fiber placement head able to apply fourteen fiber tows. The removed lane assemblies can then be serviced or cleaned while the fiber replacement head remains functional. Or the lane assemblies can be replaced with spare lane assemblies maintained in storage. The purchase and storage of lane assemblies rather than an entire fiber placement head can involve less expense and storage space.

Lane assemblies can be further modularized by including removable subassemblies. For example, the cutting lane assembly can include a cutting subassembly that is removably attached to the assembly. Composite tape that is used to create composite workpieces often is comprised of fibrous material which has been impregnated with a resin that later provides strength to the composite workpiece after the resin is activated with heat. One example of a composite is carbon fiber. This is often referred to as "pre-preg" composite. The resin included with the composite tape can be quite sticky and adhere to machinery the tape touches. As composite tape continues to pass through the cutting lane assembly, the resin carried by the tape is increasingly left behind and can interfere with cutting machinery in the subassembly. The removal and replacement of the cutting subassembly from the cutting lane assembly can increase the speed and frequency with which the cutting machinery can be serviced. The cutting subassembly includes a cutting blade and one or more lane paths through which the composite tape passes that can be formed in a blade shoe and/or base against which the cutting blade can be reciprocally moved to selectively cut the composite tape. A connector can engage or disengage the cutting subassembly from the cutting lane assembly for removal and reattachment after service.

Figure 1:
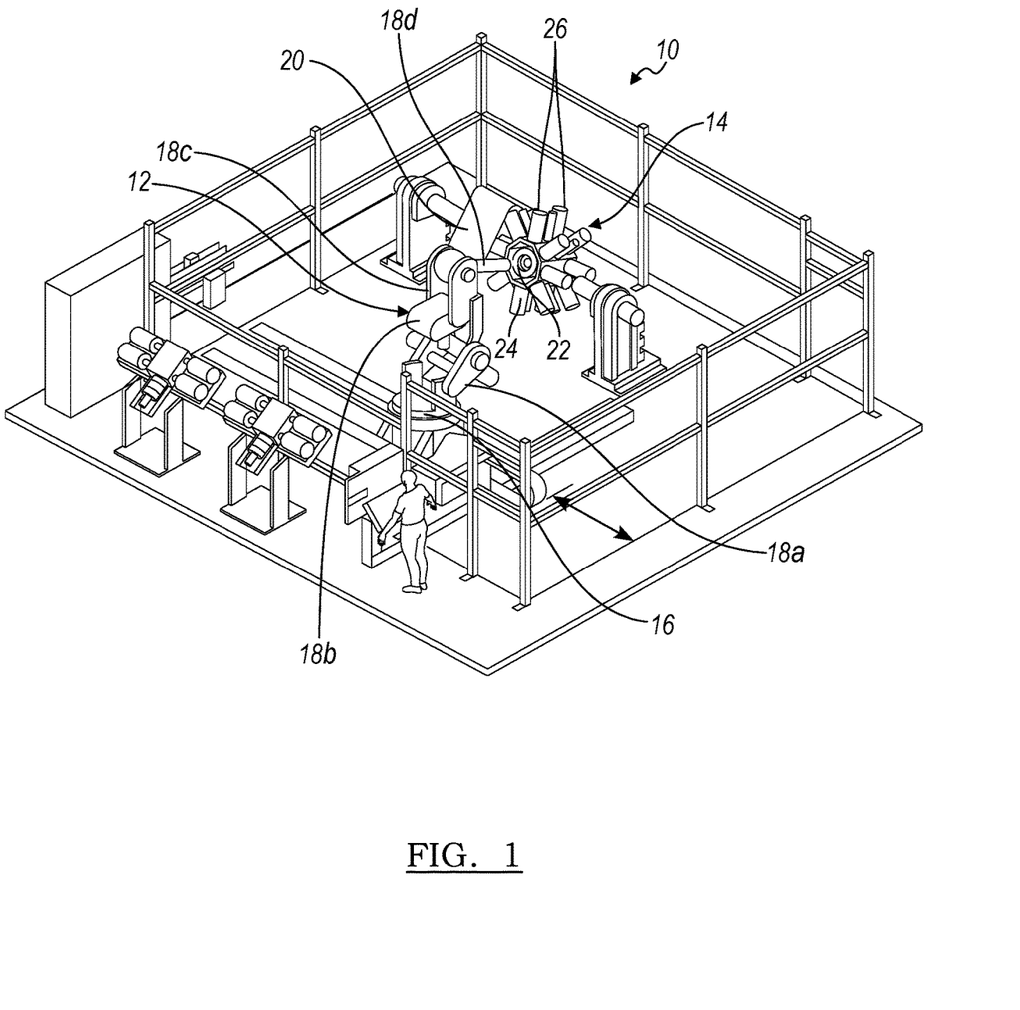
FIG. 1 is a perspective view depicting an implementation of a fiber placement machine.

An implementation of a fiber placement machine 10 is shown in FIG. 1. The fiber placement machine 10 includes a robotic arm 12 that is detachably coupled with a fiber placement head 14. The robotic arm can be supported by a base 16 upon which it moves linearly about an axis (x). A plurality of moveable segments 18, that can move by pivoting, rotating, or telescoping for example, may extend outwardly from the base 16. The robotic arm 12 can move relative to the base 16 about multiple axes. For example, a first segment 18a can rotatably couple to the base 16 at one end such that the robotic arm 12 can rotate about the base 16. A second segment 18b can pivotably couple with the first segment 18a and a third segment 18c can pivotably couple with the second segment. A fourth segment 18d can be coupled to the third segment 18c and telescopically move away from and toward the third segment. The segments 18 can be moved relative to each other using fluidic rams, electric motors, or some combination of these or other drive elements to move a distal end of the robotic 12 arm relative to a mold 20 or mandrel used to create a workpiece. A microprocessor (not shown) in communication with a computer readable storage medium having executable instructions can control movement of the fluidic rams, electric motors, or other drive element thereby controlling the motion and position of the moveable segments 18 of the robotic arm 12. The microprocessor can be any type of device capable of processing electronic instructions including microcontrollers, host processors, controllers, and application specific integrated circuits (ASICs). It can be a dedicated processor used only to carry out control of the robotic arm 12 or can be shared with other machine functions. The microprocessor executes various types of digitally-stored instructions, such as software or firmware programs stored in memory. Communications between the mechanism that moves the robotic arm, such as the fluidic rams or electric motors, and the microprocessor can be carried out over a communications bus. The robotic arm 12 can move the fiber placement head 14 along three axes to position the head 14 for service or to apply composite tape to the mold 20. While this is one implementation of a robotic arm 12 that can be used with a fiber placement head, other implementation of robotic arms or mechanical devices that apply composite tape can be used as well.

The end of the robotic arm 12 distal to the base 16 can include a chuck 22 that releasably engages the fiber placement head 14. The chuck 22 and a portion of the fiber placement head 14 can have corresponding features such that the chuck 22 can releasably grab the fiber placement head 14. In one implementation, the fiber placement head 14 includes a cylindrical shank extending orthogonal to a surface of the head 14. The robotic arm 12 can position the chuck 22 so that it engages the shank and the fiber placement head 14 is resiliently coupled to the arm 12.

Figure 2:
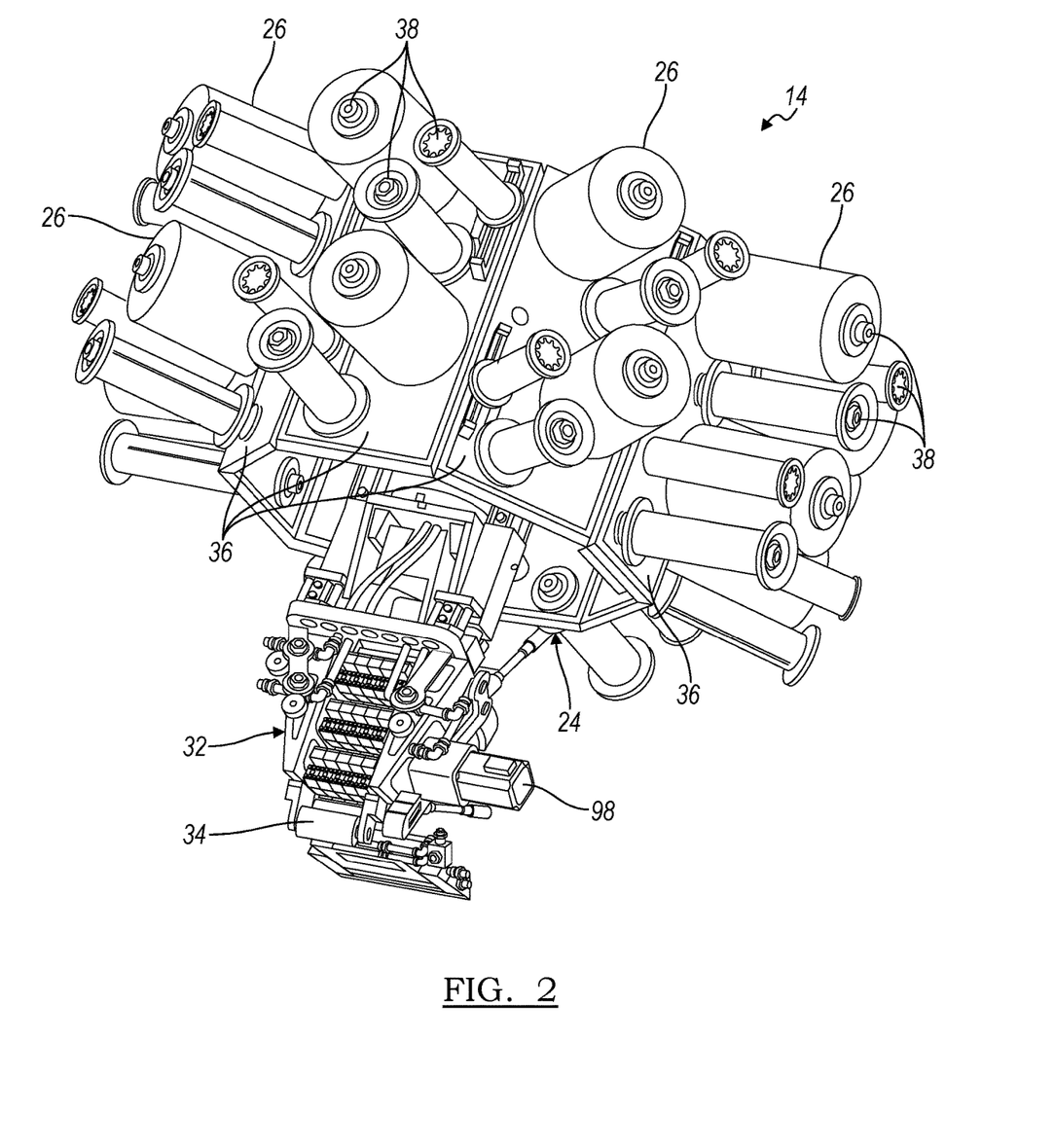
FIG. 2 is another perspective view depicting an implementation of a fiber placement head.
Figure 3:
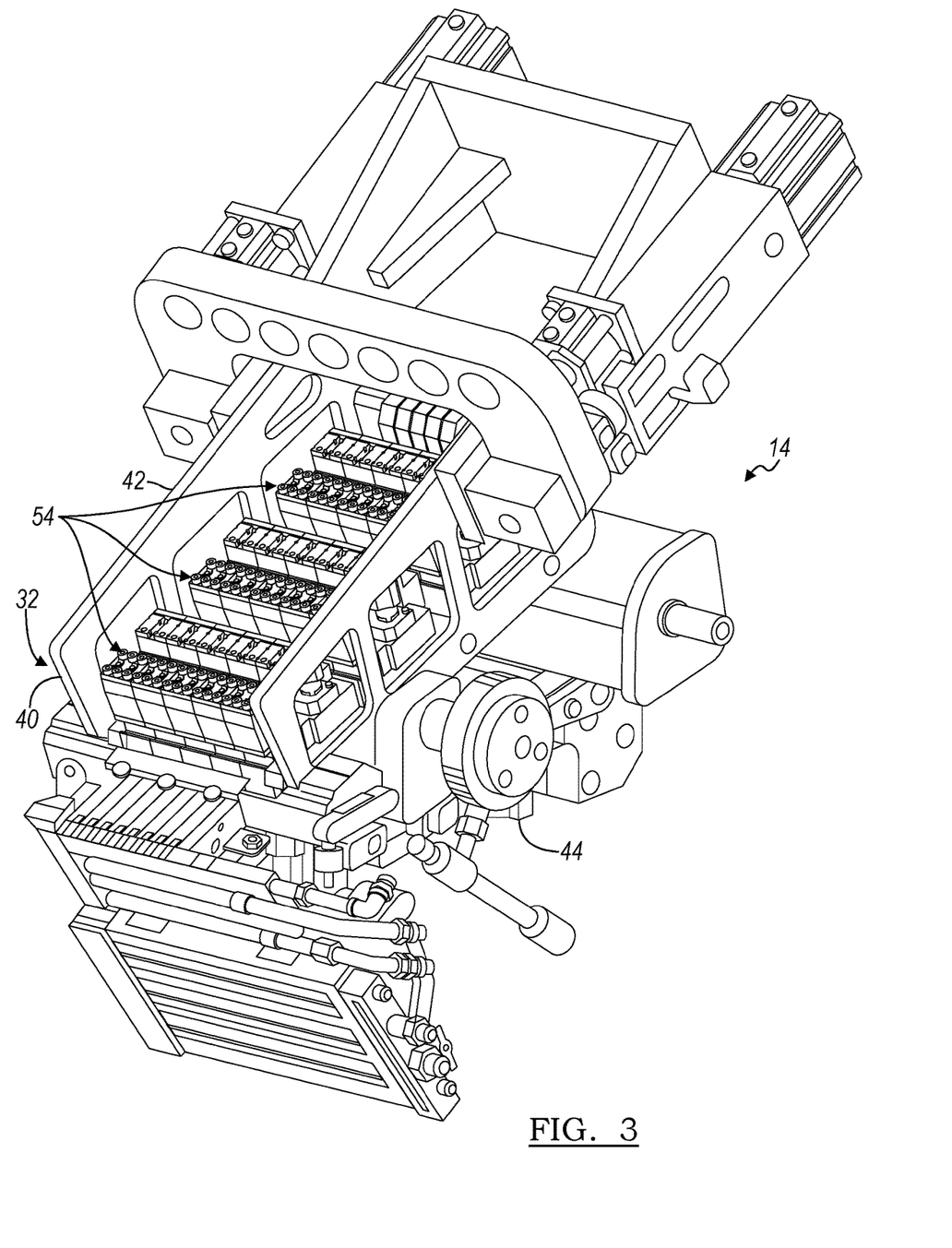
FIG. 3 is a perspective view depicting an implementation of a portion of a fiber placement head.
Figure 4:
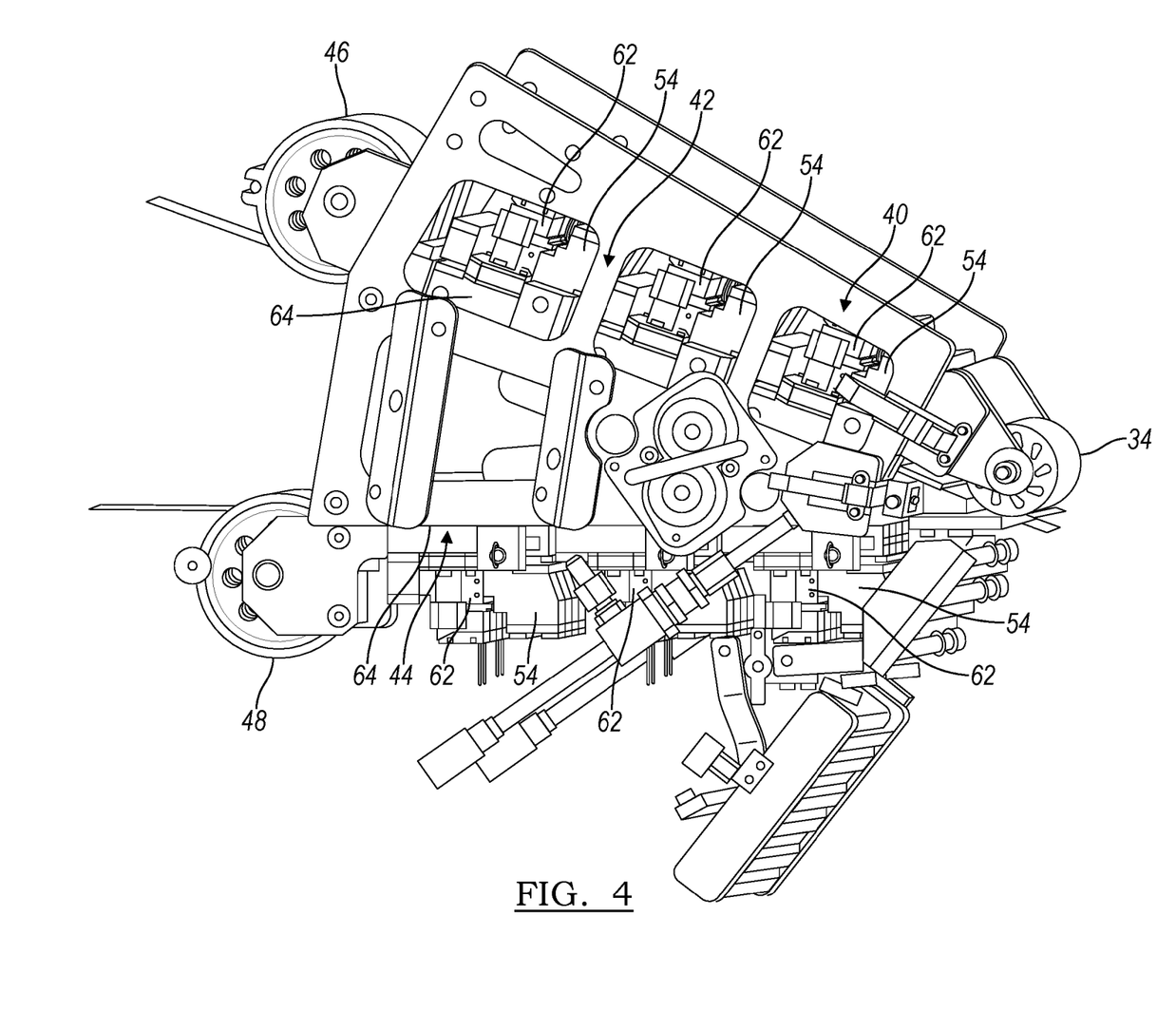
FIG. 4 is another perspective view depicting an implementation of a portion of a fiber placement head.
Figure 5:
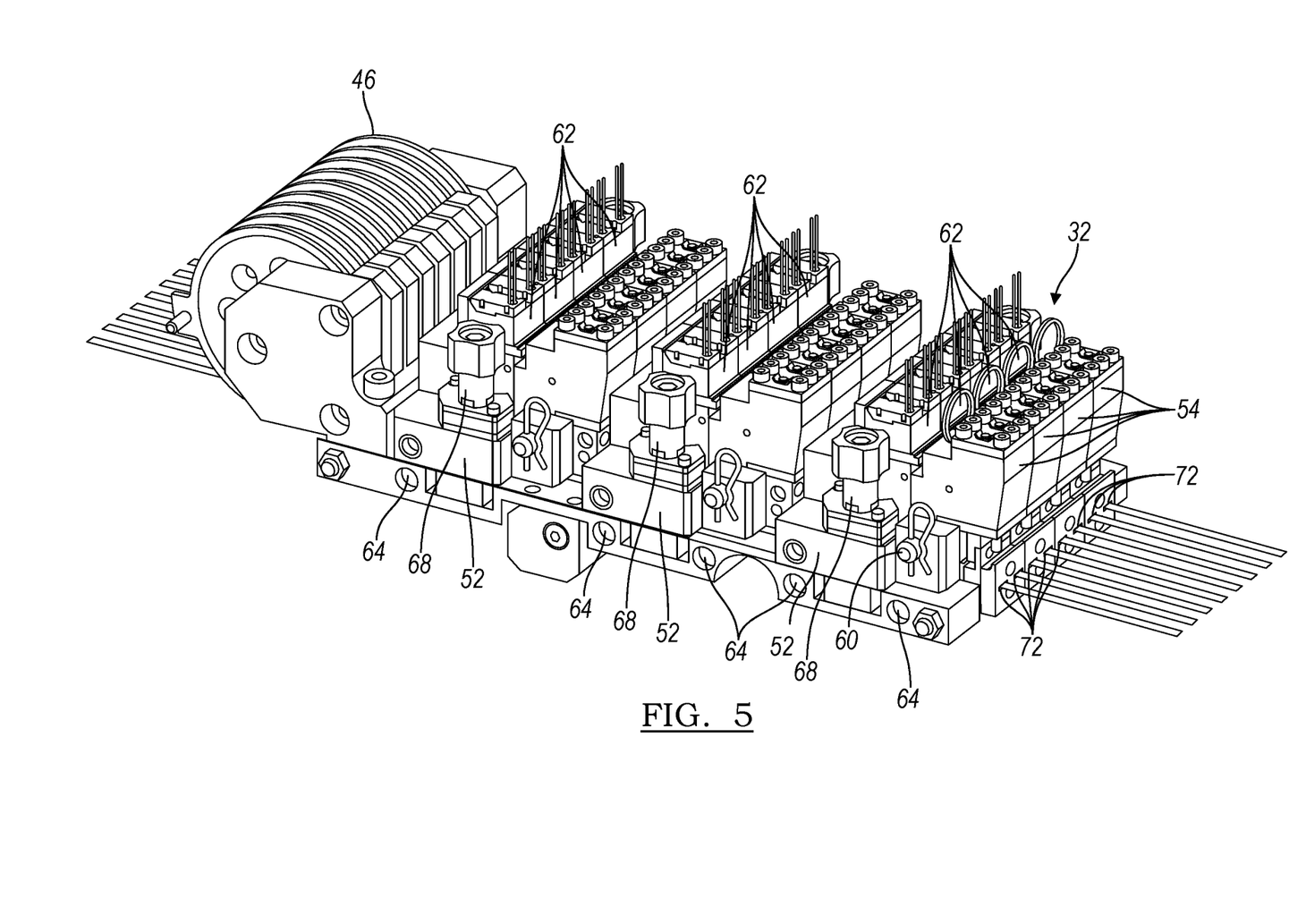
FIG. 5 is another perspective view depicting an implementation of a portion of a fiber placement head.
Figure 6:
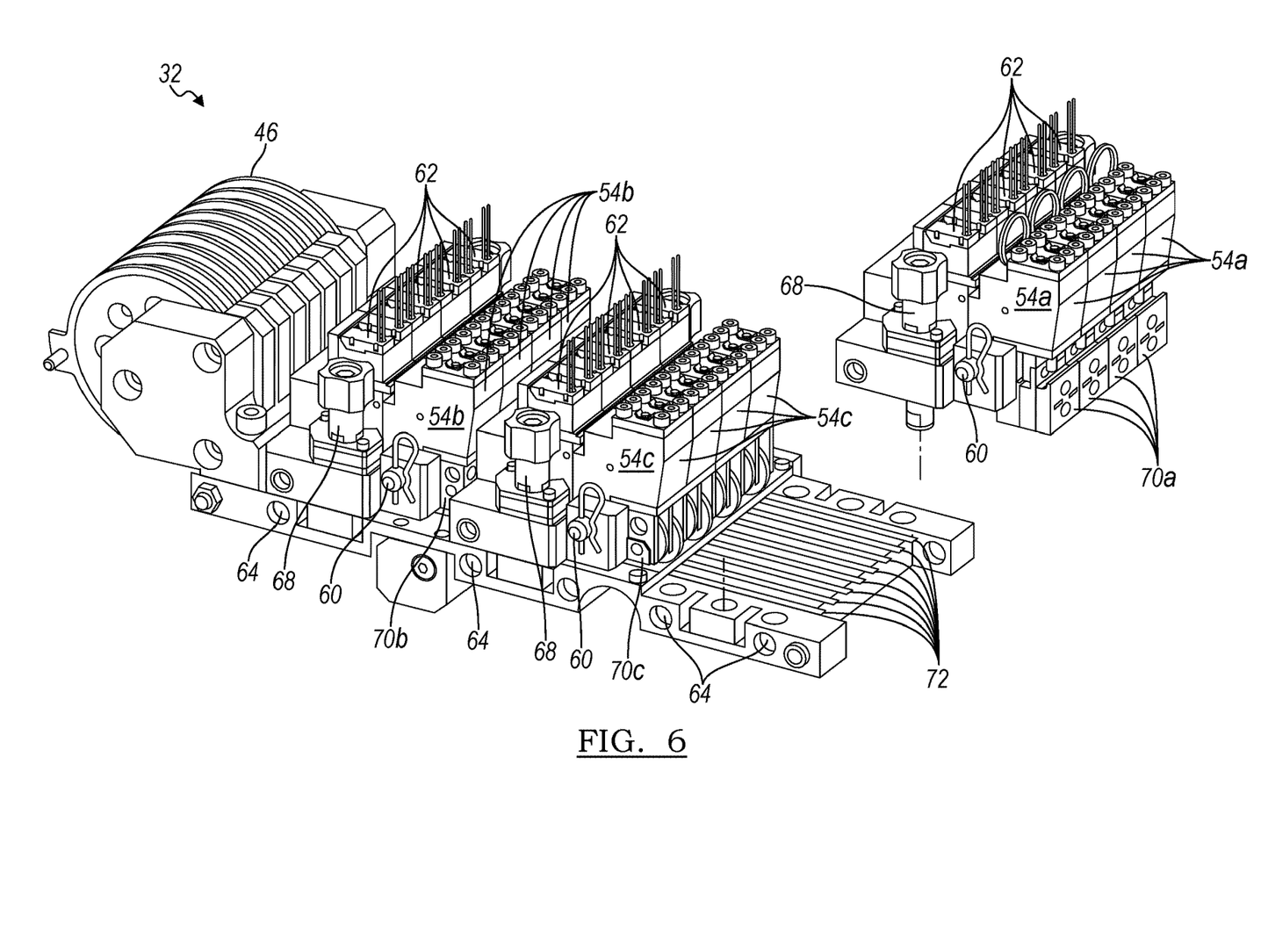
FIG. 6 is another perspective view depicting an implementation of a portion of a fiber placement head.
Figure 7A:
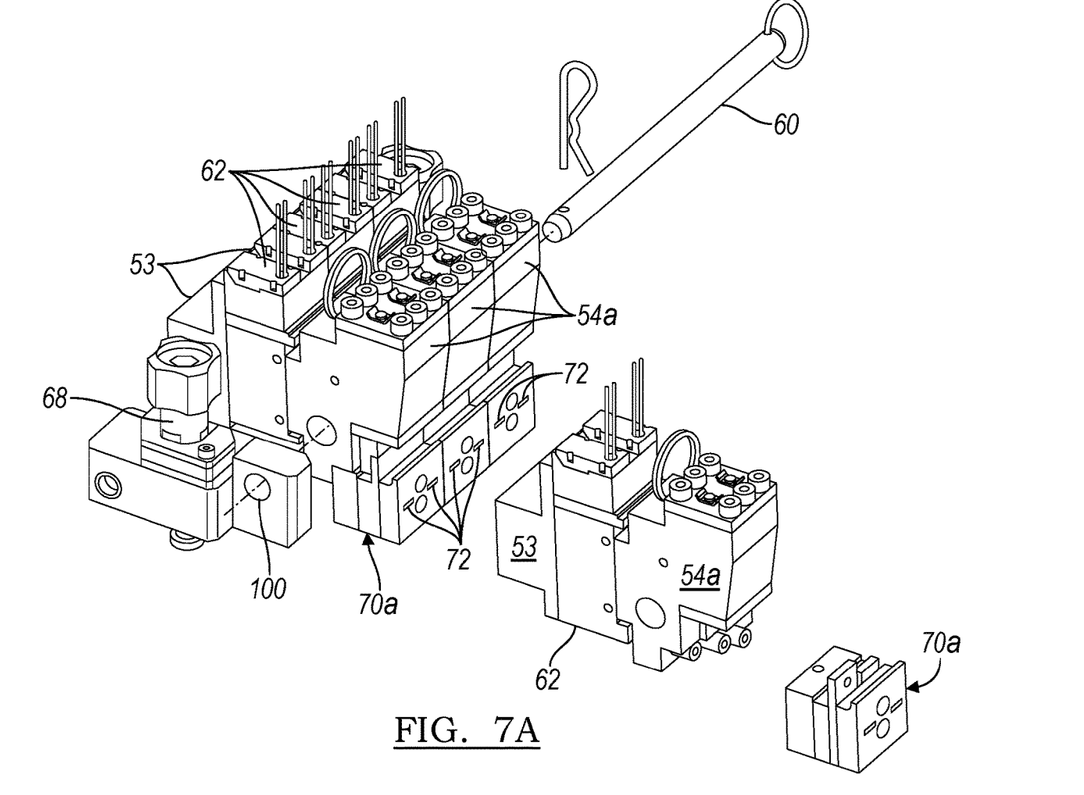
FIG. 7a is another perspective view depicting an implementation of a portion of a fiber placement head.
Figure 7B:
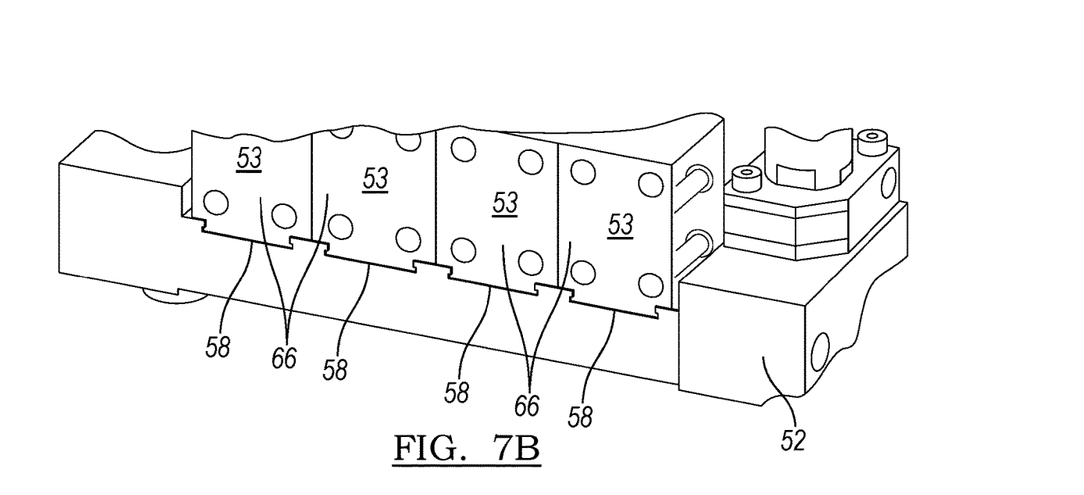
FIG. 7b is another perspective view depicting an implementation of a portion of a fiber placement head.
Figure 8:
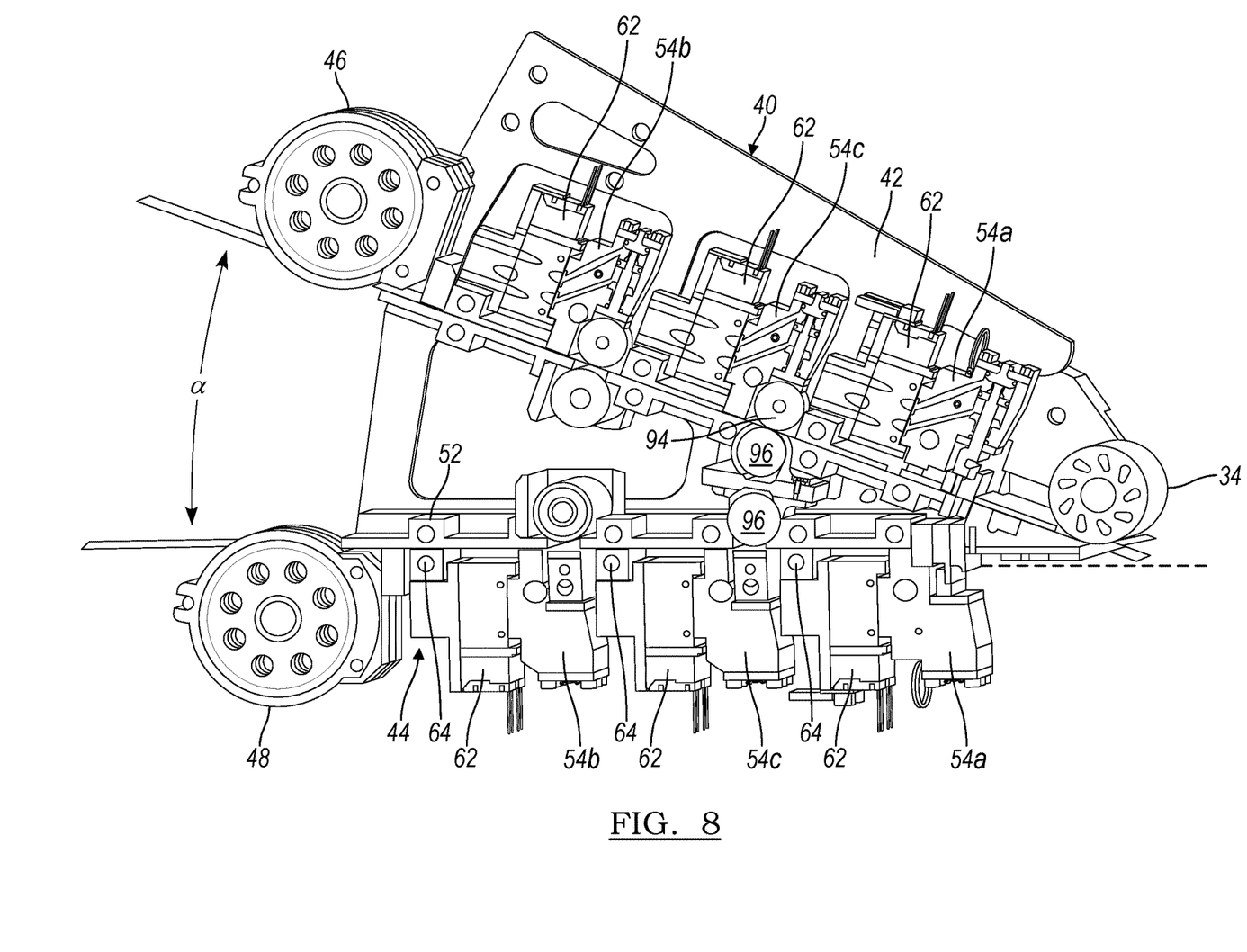
FIG. 8 is a cross-sectional view depicting an implementation of a portion of a fiber placement head.
Figure 9:
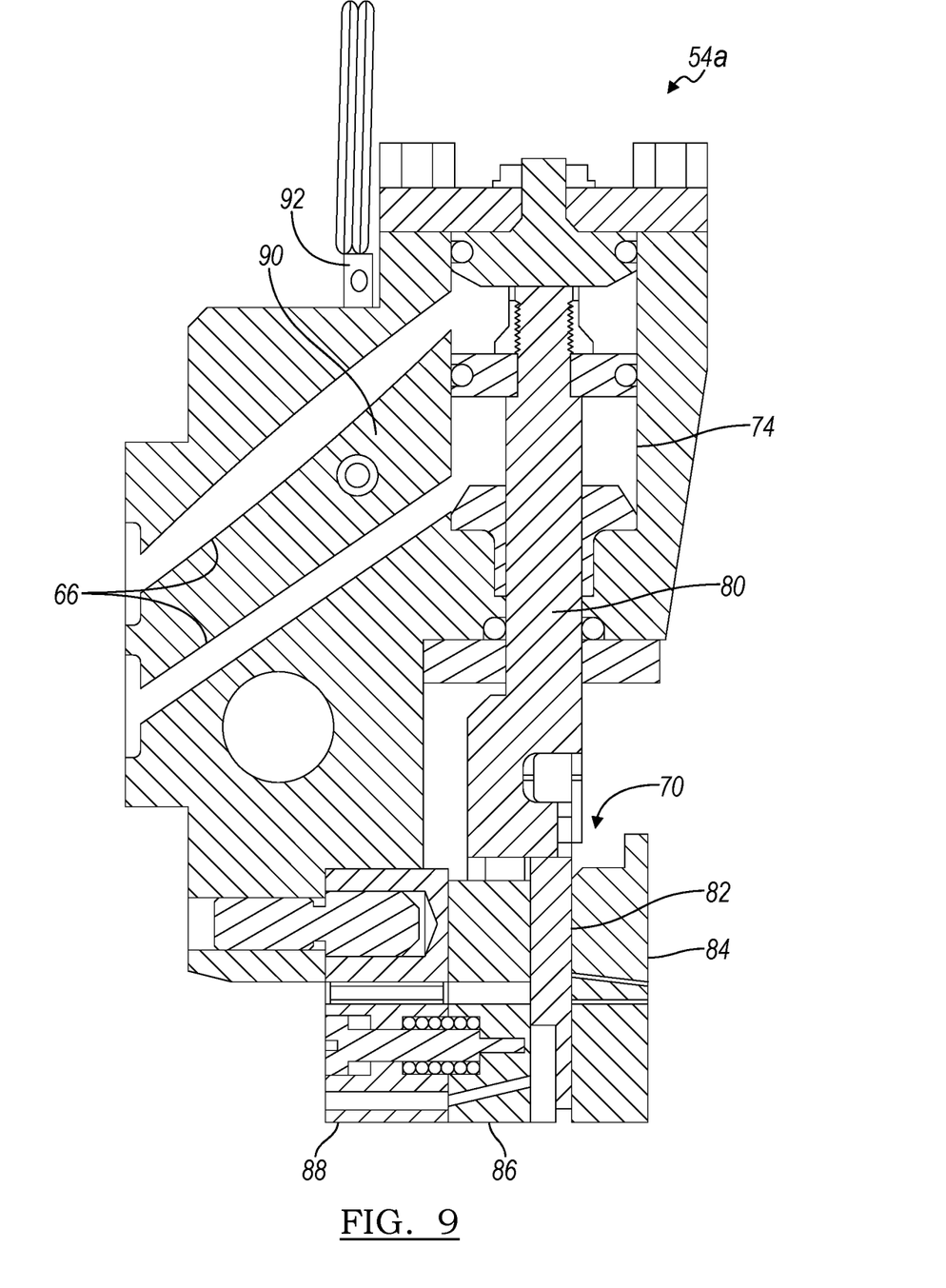
FIG. 9 is a cross-sectional view depicting an implementation of a portion of a fiber placement head.
Figure 10:
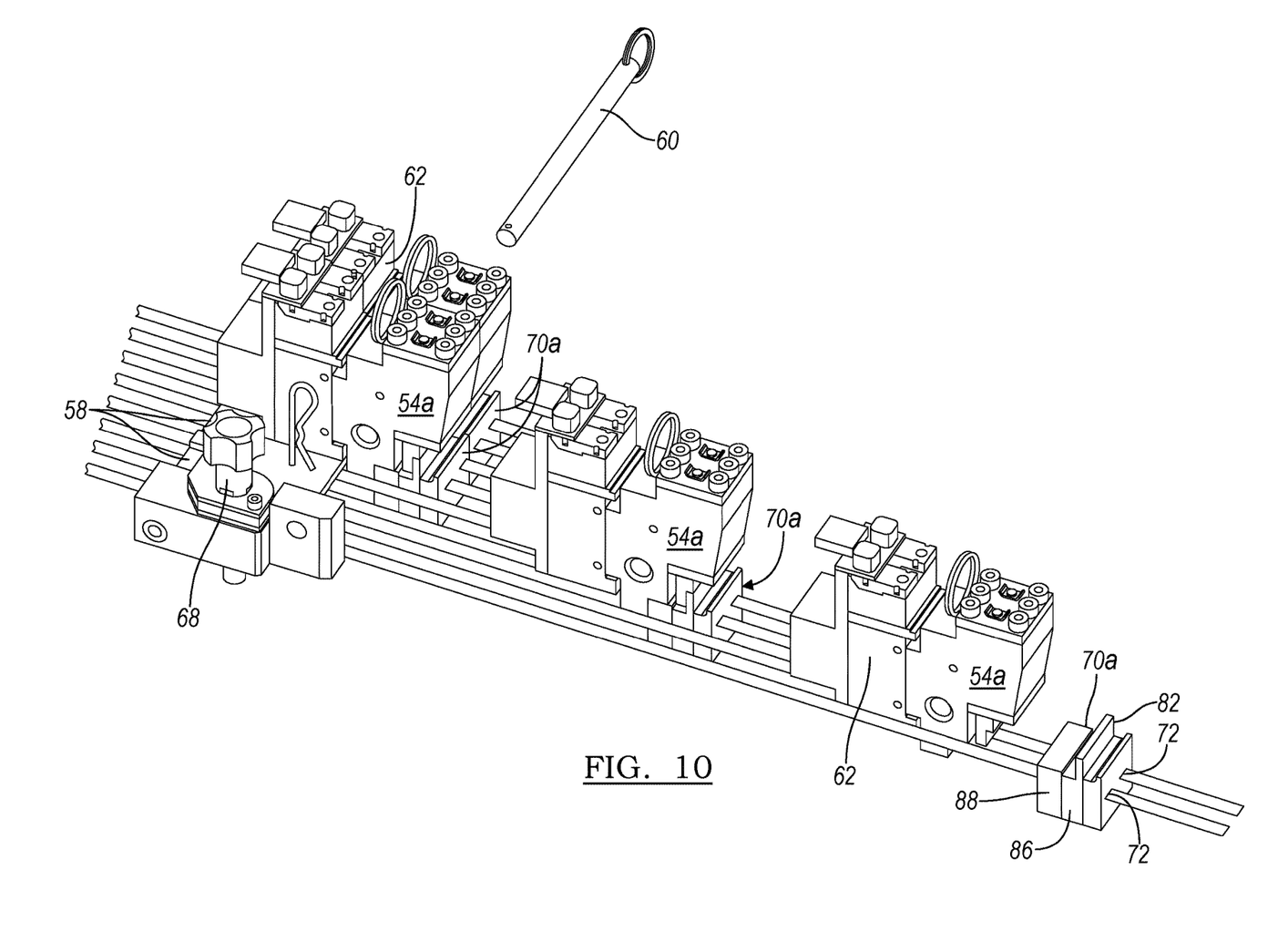
FIG. 10 is another perspective view depicting an implementation of a portion of a fiber placement head.
Figure 11:
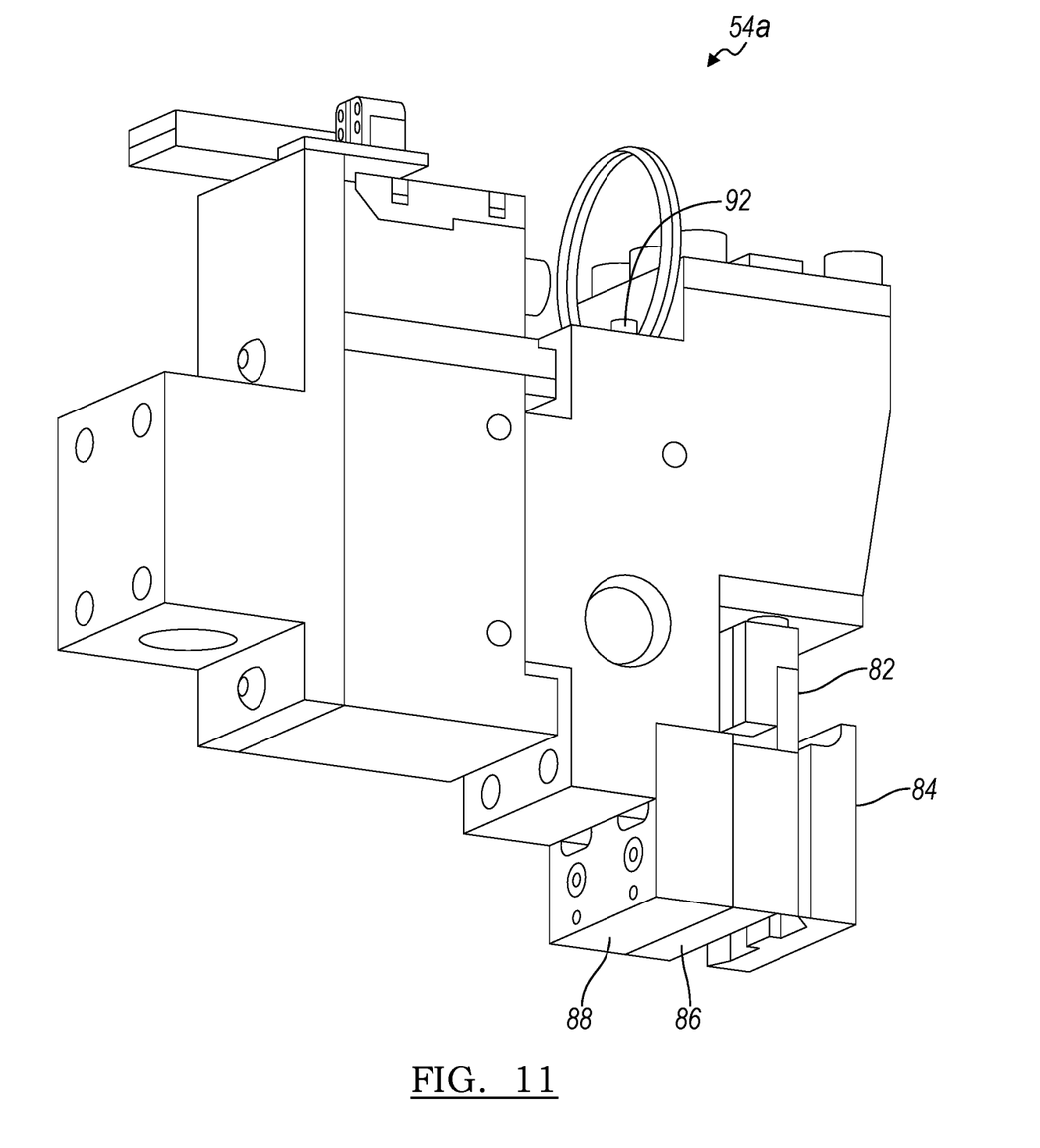
FIG. 11 is another perspective view depicting an implementation of a portion of a fiber placement head.
Figure 12:
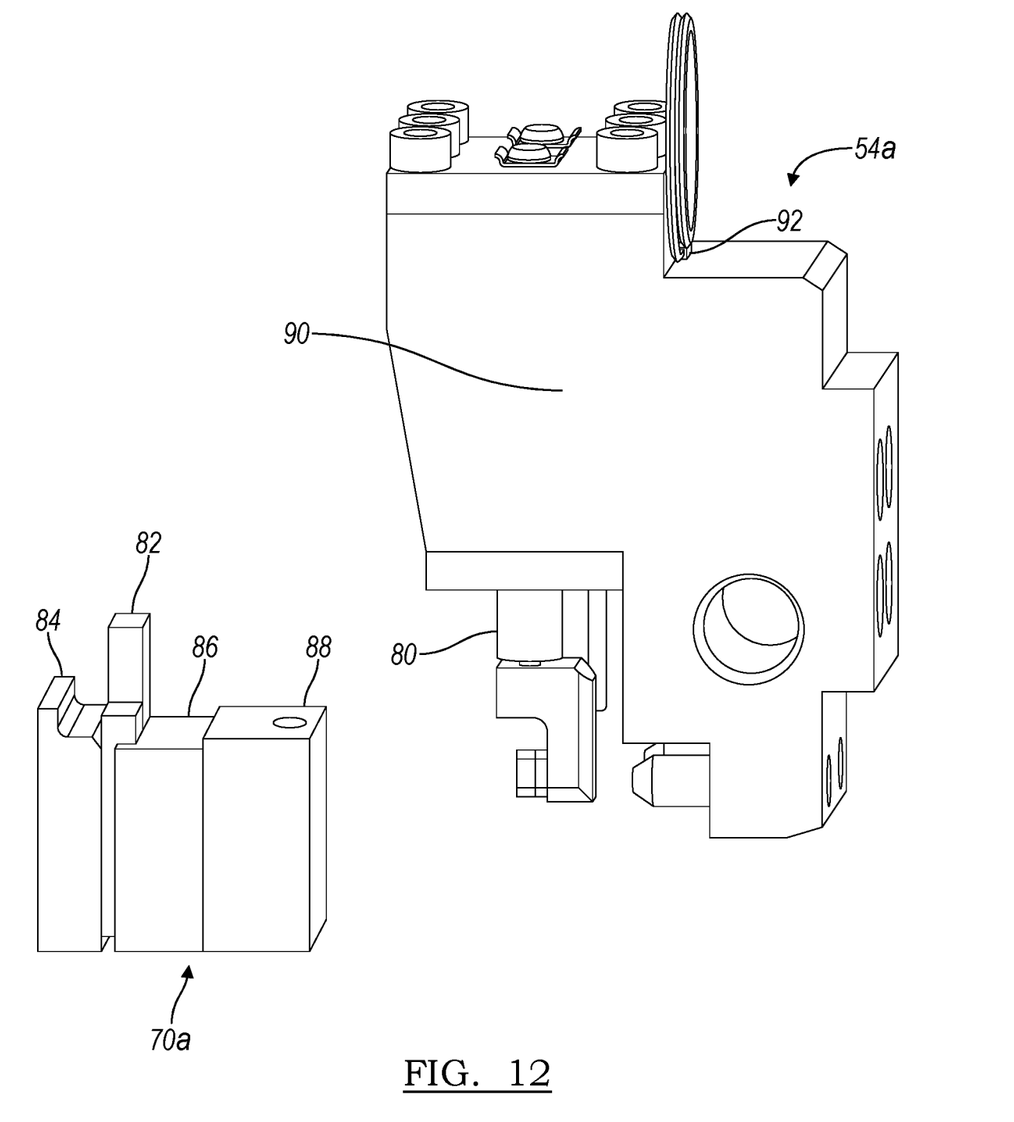
FIG. 12 is another perspective view depicting an implementation of a portion of a fiber placement head.

As shown in FIGS. 2-4, the fiber placement head 14 can include a creel 24, a plurality of spools 26 that carry composite tape as a source of this tape for the head 14, and a cut, clamp, restart (CCR) assembly 32 (shown in more detail in FIGS. 5-8). The CCR assembly 32 can include a compaction roller 34 (or alternatively a compaction roller) that can receive the composite tape from the spools 26 and apply it to the mold 20 to create a composite part. The creel frame 24 includes a plurality of outer surfaces 36 and spindles 38 mounted orthogonally relative to the outer surfaces 36. The spindles 38 can be moved to create tape tension using dancer elements controlled pneumatically, mechanically, or fluidically that help maintain tension on the composite tape as the tape is applied to the mold 20. The composite tape can unwind from the spools 26 and travel into the compaction roller 34 for ultimate application to the mold 20.

The fiber placement head 14 can include a CCR frame 40 for supporting the components of the fiber placement head 14, the CCR assembly 32, and the compaction roller 34 that ultimately presses the course of composite tapes onto the mold 20. Before arriving at the compaction roller 34, a portion of the composite tapes can pass through an upper feed portion 42 and another portion of the composite tapes can pass through a lower feed portion 44. The upper feed portion 42 can process even numbered composite tape and the lower feed portion 44 can process odd numbered composite tape that meet at the compaction roller 34. For instance, for a fiber placement head 14 having eight fiber pathways or lanes, the upper feed portion 42 can process composite tape identified by numbers 2, 4, 6, and 8 while the lower feed portion 44 can process composite tape identified by numbers 1, 3, 5, and 7. The upper feed portion 42 and the lower feed portion 44 can be separated by an angle ($\alpha$). An upper feed roller 46 and lower feed roller 48 can communicate composite tape from spools 26 to the upper feed portion 42 and lower feed portion 44, respectively. A plurality of lane assemblies 54 can be included with the upper feed portion 42 and the lower feed portion 44. Each of the upper feed portion 42 and the lower feed portion 44 can include a manifold 64 for receiving a plurality of mounting bases 52 that can releasably receive a plurality of the lane assemblies 54. The mounting base 52 can include valve attachments 68 that locate the base 52 relative to the manifold 64 and releasably couple a plurality of lane assemblies 54 relative to the fiber placement head 14. The valve attachments 68, such as a ball lock that locates the fluid passageways 66 from the mounting base 52 to the manifold 64, and helps form a fluid-tight seal between the rear air block 53 and the base 52. The base 52 includes a plurality of attachment sites 58 (FIG. 7b) where the lane assemblies 54 ultimately couple to the base 52. The base 52 can be a discrete element that couples to the manifold 64 in which a plurality of electromagnetic valves 62 and lane assemblies 54 can be removed or installed simultaneously. In one implementation, the attachment site 58 can be a female dovetail that receives a corresponding male dovetail included with an element of the lane assembly 54 or a rear air block 53. The lane assemblies 54 can slide relative to the mounting base 52 via the dovetail connection during installation or removal of the assemblies 54 with respect to the fiber placement head 14. However, a plurality of lane assemblies 54 can ultimately be fixed to the mounting base 52 with a cross pin 60 that passes transverse to the direction in which the assembly 54 slides with respect to the dovetail and engages a portion of the mounting base 52 to prevent the movement of the lane assemblies 54 relative to the mounting base 52.

Electromechanical valves 62 abut the lane assemblies 54 and can be coupled to the mounting base 52 via a rear air block 53. Each lane assembly 54 can abut an electromagnetic valve 62 such that the valve 62 selectively supplies compressed air to the assembly 54 for actuation. The mounting base 52 can couple with the manifold 64 and fluid passageways 66 communicate compressed air from a source (not shown) through the rear air block 53 and the electromechanical valves 62 ultimately arriving at the lane assemblies 54 coupled to the base 52. An assembly of a rear air block 53, an electromagnetic valve 62, and a lane assembly 54 can be removably secured to the mounting base 52 using the cross pin 60. Compressed air can be selectively supplied to a lane assembly 54 by the electromagnetic valve 62 thereby communicating the air from the manifold 64 and the rear air block 53. In one implementation, the electromagnetic valve 62 includes a solenoid receiving a voltage that is controlled by a switch the microprocessor opens and closes to control actuation of the lane assembly 54.

Turning to FIGS. 9-12, lane modules 54 can each include a subassembly 70 that carries out a function of the fiber placement head 14 and one or more lane paths 72 through which composite tape passes. A pneumatic cylinder 74 for each subassembly 70 can control the function of the fiber placement head 14. An element of the subassembly 70 can be coupled with the pneumatic cylinder 74 and flow of compressed air into the pneumatic cylinder 74 from the manifold 64 can have an effect on the composite tape passing through the lane paths. In one embodiment, fluid passages 66 can communicate compressed air from an electromechanical valve 62 to a pneumatic piston assembly 80 that includes a piston. The pneumatic piston assembly 80 can slide relative to the cylinder 74 thereby performing some action on the composite tape depending on the subassembly 70 attached to the lane assembly 54.

Cutting lane assemblies 54a can include cutting subassemblies 70a. The cutting subassembly 70a can be removably attached to the cutting lane assembly 54a and include a cutting blade 82, an anvil plate 84, a spring-loaded blade shoe 86, and a base 88. The cutting subassembly 70a can include a portion of a lane path 72 through which the composite tape passes. For example, the cutting blade 82 can be biased against the anvil plate 84 by the spring-loaded blade shoe 86 to create a scissoring cut as the pneumatic piston assembly 80 moves relative to the pneumatic cylinder 74 and cuts the composite tape as the composite tape passes through the lane path 72 of the cutting subassembly 70a. The cutting blade 82 and the anvil plate 84 when positioned relative to each other in a first position can permit the composite tape to pass through a lane path 72 and when the cutting blade 82 is moved relative to the anvil plate 84, the tape can be cut. When in the first position, openings in the cutting blade 82 and openings in the anvil plate 84 and base 88 can at least partially define the lane paths 72. A fastener 92, such as an elongated member, pin, dowel, or threaded screw, can extend through an aperture 90 in the cutting lane assembly 54a and engage with the cutting subassembly 70a to secure it to the cutting lane assembly 54a. The fastener 92 can be removed from the cutting lane assembly 54a and the cutting subassembly 70a to release the subassembly 70a from the cutting lane assembly 54a for service or replacement. In this implementation, the fiber placement head 14 includes eight cutting lane assemblies 54a-four cutting lane assemblies 54a on the upper feed portion 42 and four cutting lane assemblies 54a on the lower feed portion 44. However, other implementations with greater or fewer cutting lane assemblies 54a are possible.

Other lane assemblies 54 include clamping lane assemblies 54b and restarting lane assemblies 54c. The clamping lane assemblies 54b and restarting lane assemblies 54c can include a plurality of lane paths 72 and include a pneumatic piston 80 for each lane path 72 that can be selectively actuated so that it slides to hold composite tape in place. A clamping subassembly 70b and a restarting subassembly 70a can each include a guide wheel 94 for holding composite tape while it is applied on the mold 20. Powered wheels 96 can be positioned on an opposite side of the composite tape so that the powered wheels 96 oppose corresponding guide wheels 94. The powered wheels 96 can be driven by an electric motor 98 having an output shaft that is coupled with the wheels 96. The powered wheels 96 can be rotated by the electric motor 98 to move the composite tape or the powered wheels 96 can be held immobile for firmly holding the composite tape. It is possible for the composite tape to be held immobile against a sprag (one-way) bearing, clutched shaft, or a stationary plate.

The guide wheel 94 contacts a side of the composite fiber tape opposite from the side contacted by the powered wheels 96 thereby squeezing the tape between the wheels. The guide wheel 94 can work in cooperation with the powered wheels 96 to either move composite tape through the lane paths 72 or hold the composite tape in place. The powered wheels 96 can be driven by the electric motor 98 while the guide wheels 94 can freely rotate and permit the composite fiber tape to move. Or the electric motor 98 can hold the powered wheels 96 still and the pneumatic piston 80 can be actuated to prevent the guide wheels 94 from rotating to hold the tape in place. The pneumatic piston 80 can move in response to the receipt of compressed air to selectively hold the guide wheel 94 immobile thereby holding the composite fiber in place. In this implementation, the fiber placement head 14 includes eight clamping lane assemblies 54b and eight restarting lane assemblies 54c-four clamp lane assemblies and four restart lane assemblies on the upper feed portion 42 and four clamping lane assemblies 54b and four restarting lane assemblies 54c on the lower feed portion 44. In this implementation, the fiber placement head 14 can include twenty-four lane assemblies 54 including the cutting lane assemblies 54a. However, other implementations with greater or fewer lane assemblies 54 are possible.

The robotic arm 12 can move the fiber placement head 14 relative to the mold 20 to create a composite part. The robotic arm 12, the powered wheels 96, the cutting lane assemblies 54a, the clamping lane assemblies 54b, and the restarting lane assemblies 54c work in concert to apply composite tape to the mold 20. The restarting lane assemblies 54c can move the composite fiber through the lanes 72 until it reaches the compaction roller 34. The clamping lane assemblies 54b can then be actuated to hold the composite fiber preventing it from moving within the lanes 72. The compaction roller 34 can then be moved into contact with the mold 20 and apply an end of the composite tape to the mold 20. The clamping lane assemblies 54b can release the composite fiber and the robotic arm 12 moves the fiber placement head 14 over the mold 20 and the compaction roller 34 can apply the composite tape to the mold 20. Once a defined amount of composite tape has been applied to the mold 20, the clamping lane assemblies 54b can be actuated to hold the composite tape from the spools 26 in place and the cutting lane assemblies 54a can be actuated to cut the desired length of composite tape that is applied to the mold 20. The restarting lane assemblies 54c can be engaged and the clamping assemblies 54b disengaged to permit additional composite tape to be supplied to the compaction roller 34 so that a new course of composite tape can be applied to the mold 20.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A fiber placement head for applying a plurality of composite tape segments on a mold, comprising:
   one or more lane assemblies each having:
      one or more fluid passageways that receive compressed air;
      a piston assembly that selectively moves relative to the lane assembly in response to receipt of compressed air;
      an attachment site configured to releasably couple the lane assembly to a portion of the fiber placement head;
      an aperture in the lane assembly configured to receive a fastener that releasably couples a subassembly to the lane module, wherein a piston from the piston assembly engages the subassembly; and
   a subassembly releasably coupled to each lane module by the fastener received by the aperture.

2. The fiber placement head recited in claim 1, wherein the lane assembly comprises a lane cutting assembly having a cutting subassembly with a blade and a base, wherein the blade fixably attaches to the piston assembly.

3. The fiber placement head recited in claim 1, further comprising a restarting lane subassembly having a power wheel.

4. The fiber placement head recited in claim 1, further comprising a clamping lane subassembly having a guide wheel.

5. The fiber placement head recited in claim 1, further comprising an electromechanical valve for each lane assembly that controls the supply of compressed air to the piston assembly.

6. The fiber placement head recited in claim 1, wherein the fastener is an elongated pin received by the aperture.

7. The fiber placement head recited in claim 1, further comprising an upper feed portion that carries a plurality of lane modules and a lower feed portion that carries a plurality of lane assemblies, wherein the upper feed portion and the lower feed portion are oriented relative to each other by an angle.

8. The fiber placement head recited in claim 1, further comprising a manifold and a base that carries a plurality of lane assemblies and releasably couples from the manifold.

9. A fiber placement head for applying a plurality of composite tape segments on a mold, comprising:
   one or more cut clamp restart (CCR) assemblies, each comprising:
      at least one cutting lane assembly having a removable cutting subassembly;
      at least one clamping lane assembly having a guide wheel;
      at least one restart lane assembly having a power wheel, wherein the cutting lane assembly, the clamping lane assembly, and the restart lane assembly each includes:
      one or more fluid passageways that receive compressed air;
      a piston assembly that selectively moves in response to receipt of compressed air;
      an attachment site configured to releasably couple to a portion of the fiber placement head;
      an aperture configured to receive a fastener that releasably couples to a submodule; and
   a cutting subassembly releasably coupled to the cutting lane assembly.

10. The fiber placement head recited in claim 9, wherein the cutting subassembly comprises a blade and a base, wherein the blade fixably attaches to the piston assembly.

11. The fiber placement head recited in claim 9, further comprising an electromechanical valve included with the cutting lane assembly, the clamping lane assembly, or the restart lane assembly that controls the supply of compressed air to the piston assembly.

12. The fiber placement head recited in claim 9, wherein the fastener is an elongated pin received by the aperture.

13. The fiber placement head recited in claim 9, further comprising an upper feed portion that carries a plurality of lane modules and a lower feed portion that carries a plurality of lane assemblies, wherein the upper feed portion and the lower feed portion are oriented relative to each other by an angle.

14. The fiber placement head recited in claim 9, further comprising a manifold and a base that carries a plurality of lane assemblies and releasably couples from the manifold.

15. The fiber placement head recited in claim 9, further comprising a creel frame having one or more spindles configured to support a spool of composite tape.

* * * * *